INVENTOR.
HIRAM E. TEMPLE
BY HIS ATTORNEYS
HARRIS, KIECH, FOSTER & HARRIS

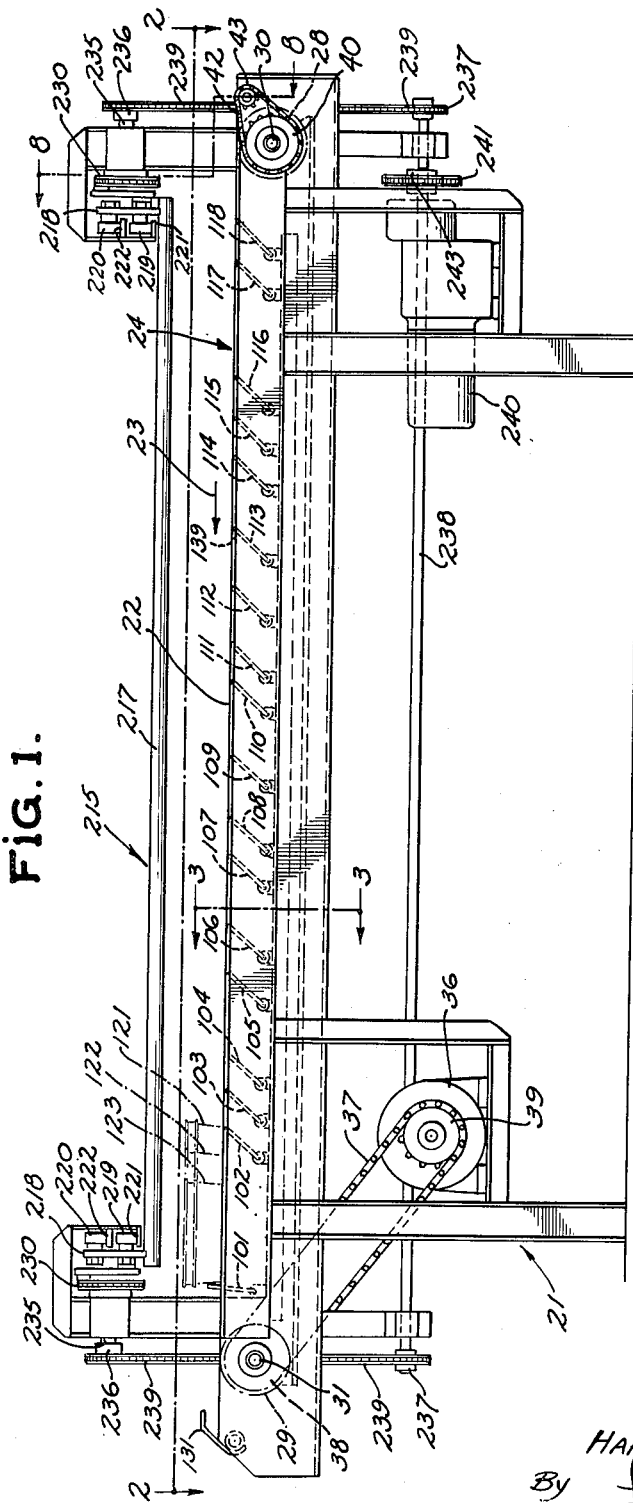
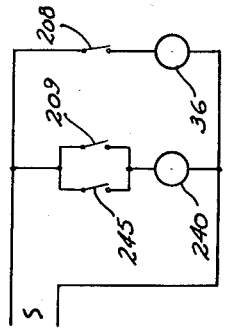
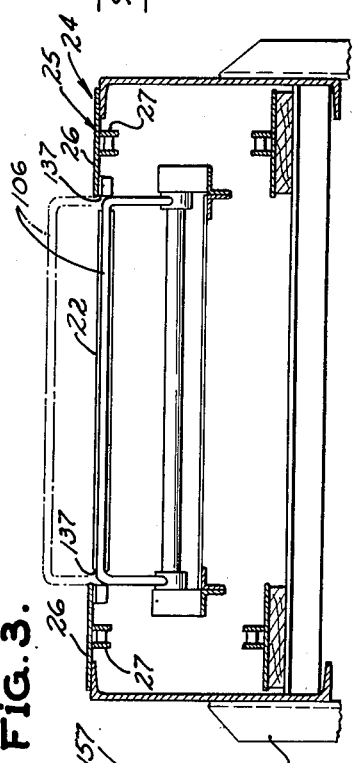
April 29, 1952 — H. E. TEMPLE — 2,595,022
SELECTIVE ARTICLE SPACING APPARATUS FOR CONVEYERS
Filed Jan. 25, 1951 — 4 Sheets-Sheet 1
INVENTOR.
HIRAM E. TEMPLE
BY HIS ATTORNEYS
HARRIS, KIECH, FOSTER & HARRIS April 29, 1952 H. E. TEMPLE 2,595,022
SELECTIVE ARTICLE SPACING APPARATUS FOR CONVEYERS
Filed Jan. 25, 1951 4 Sheets-Sheet 2

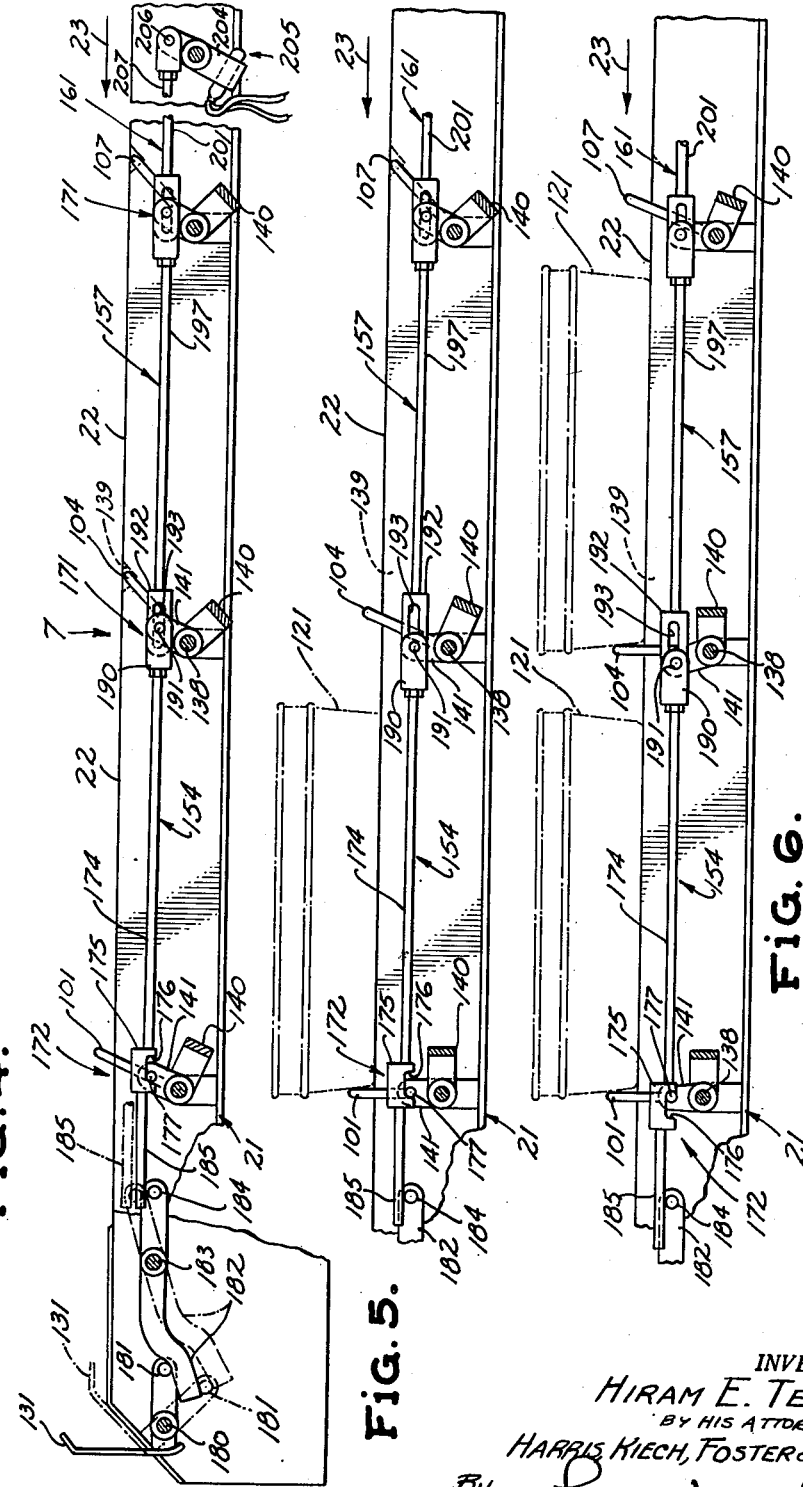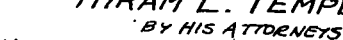

April 29, 1952   H. E. TEMPLE   2,595,022
SELECTIVE ARTICLE SPACING APPARATUS FOR CONVEYERS
Filed Jan. 25, 1951   4 Sheets-Sheet 4

INVENTOR.
HIRAM E. TEMPLE
BY HIS ATTORNEYS
HARRIS, KIECH, FOSTER & HARRIS

Patented Apr. 29, 1952

2,595,022

UNITED STATES PATENT OFFICE 2,595,022

SELECTIVE ARTICLE SPACING APPARATUS
FOR CONVEYERS

Hiram E. Temple, San Gabriel, Calif., assignor to
Read Standard Corporation, a corporation of
Delaware Application January 25, 1951, Serial No. 207,772

10 Claims. (Cl. 198—34)

The present invention relates in general to an apparatus for periodically transferring articles being transported by a conveyor onto another conveyor operating transversely of the first so as to load the articles being transported by the first conveyor onto the second conveyor in the form of ranks extending transversely thereof, a primary object of the invention being to provide an apparatus for spacing the articles apart predetermined distances in the direction of movement of the first conveyor so that the articles will be spaced apart transversely of the second conveyor when transferred thereonto.

The invention finds particular utility in the baking industry for spacing straps of pans containing bread or other goods to be baked in the direction of movement of a conveyor which delivers the pan straps to the inlet end of a traveling oven in single file and which operates at right angles to the traveling oven. The pan straps delivered to the inlet end of the oven in spaced relation in this manner are periodically loaded into the oven in the form of pan strap ranks extending transversely thereof. In such an application of the invention, the pan straps in each rank loaded into the traveling oven are spaced apart predetermined distances to prevent contact of the bakery goods in adjacent straps in the rank and to provide uniform circulation of heated air for all of the pan straps. While the invention may be employed for spacing pan straps particularly advantageously and will be considered in connection therewith hereinafter as a matter of convenience, it will be understood that the invention may be employed for spacing various other articles as well.

An important object of the invention is to provide an article spacing apparatus which is provided with means for spacing apart articles of various lengths. More particularly, an object in this connection is to provide an article spacing apparatus having a plurality of spacing means each adapted to space apart articles of a particular length, and having selector means for activating any one of the spacing means.

Thus, the present invention may be employed for spacing pan straps of different sizes, the size of a pan strap depending upon the dimensions of the individual pans incorporated therein, the spacing of the individual pans in the strap, the number of pans in the strap, and so forth. For example, a strap of bread pans includes a plurality of pans arranged side by side in spaced relation and secured together by an encircling strap, the dimension of the pan strap in the direction of the longitudinal axes of the individual pans depending upon the length of the pans, and the dimension of the pan strap crosswise of the individual pans depending upon the number of pans in the strap, the spacing of the pans, and so forth.

Considering the present invention more specifically, an important object thereof is to provide a conveyor for moving pan straps in single file along a predetermined path, a master stop positioned adjacent the downstream end of the path of the pan straps for intercepting the first pan strap in the file, and a sequence of slave stops spaced apart along the path of the pan straps upstream from the master stop for intercepting succeeding pan straps in the file.

More particularly, an important object of the invention is to provide such a spacing apparatus in which the first slave stop in the sequence is activated by the master stop upon interception of a pan strap by the master stop, the second slave stop in the sequence is activated by the first slave stop upon interception of a pan strap by the first slave stop, and so forth.

Another object is to provide such a spacing apparatus wherein the slave stops are normally disposed in inoperative, retracted positions and are movable into partially extended positions wherein they are operative to intercept pan straps upon interception of pan straps by the respective stops downstream therefrom, the respective slave stops being movable into their partially extended, operative positions in sequence as pan straps are intercepted by the adjacent stops downstream therefrom.

Another object is to provide a spacing apparatus wherein each slave stop is movable from its inoperative, retracted position to its operative, partially extended position in response to movement of the adjacent stop downstream therefrom from a partially extended, operative position to a fully extended position upon interception of a pan strap.

Thus, as the master stop intercepts a pan strap and is moved from its partially extended position to its fully extended position thereby, it moves the first slave stop in the sequence from its inoperative, retracted position to its partially extended position. As the first slave stop in the sequence is moved from its partially extended position to its fully extended position by a pan strap intercepted thereby it moves the second slave stop in the sequence from its inoperative, retracted position to its partially extended position, and so forth, which is an important feature of the invention.

Another important object of the invention is to provide such a spacing apparatus with a plurality of sequences of slave stops each operatively connectible to the master stop for actuation thereby, and to provide such a spacing apparatus with selector means for operatively connecting any one of the slave-stop sequences to the master stop to render such slave-stop sequence operative. A related object is to provide such a spacing apparatus wherein the spacing of each slave-stop sequence from the master stop and the spacing of the individual slave stops of such sequence differ from the corresponding spacings for the other slave-stop sequences so that each of the slave-stop sequences may be employed to space apart articles of a different length under the control of the aforementioned selector means.

Another object is to provide a spacing apparatus wherein the slave stops of each sequence are interconnected by link means each of which moves one of the slave stops from its inoperative, retracted position to its partially extended position in response to movement of the slave stop downstream therefrom from its partially extended position to its fully extended position upon interception of a pan strap.

Another object is to provide a link means for the first slave stop in each sequence which is operatively connectible to the master stop by the aforementioned selector means so as to render that particular slave-stop sequence operative.

Another object is to provide an apparatus which includes transfer means for transporting the pan straps or other articles spaced apart by the spacing apparatus laterally into a traveling oven, for example.

Another object is to provide means for operating the spacing apparatus and the transfer means in timed relation, the transfer means being controlled by the last slave stop in the particular slave-stop sequence in operation so that the transfer means transports the spaced pan straps laterally only after the master stop and each of the slave stops in the slave-stop sequence in operation have intercepted the pan straps.

The foregoing objects of the present invention and the advantages suggested thereby, together with various other objects and advantages which will become apparent, may be attained with the exemplary embodiments of the invention which are illustrated in detail in the accompanying drawings and which are described hereinafter. Referring to the drawings:

Fig. 1 is a side elevation of a spacing apparatus of the invention;

Fig. 3 is a sectional view taken along the broken line 3—3 of Fig. 1;

Figs. 4, 5 and 6 are enlarged, fragmentary elevational views illustrating the operation of the spacing apparatus;

Fig. 7 is a further enlarged, fragmentary view taken as indicated by the arrow 7 of Fig. 4;

Fig. 9 is a schematic view of an electrical circuit of the spacing apparatus;

Figure 2:
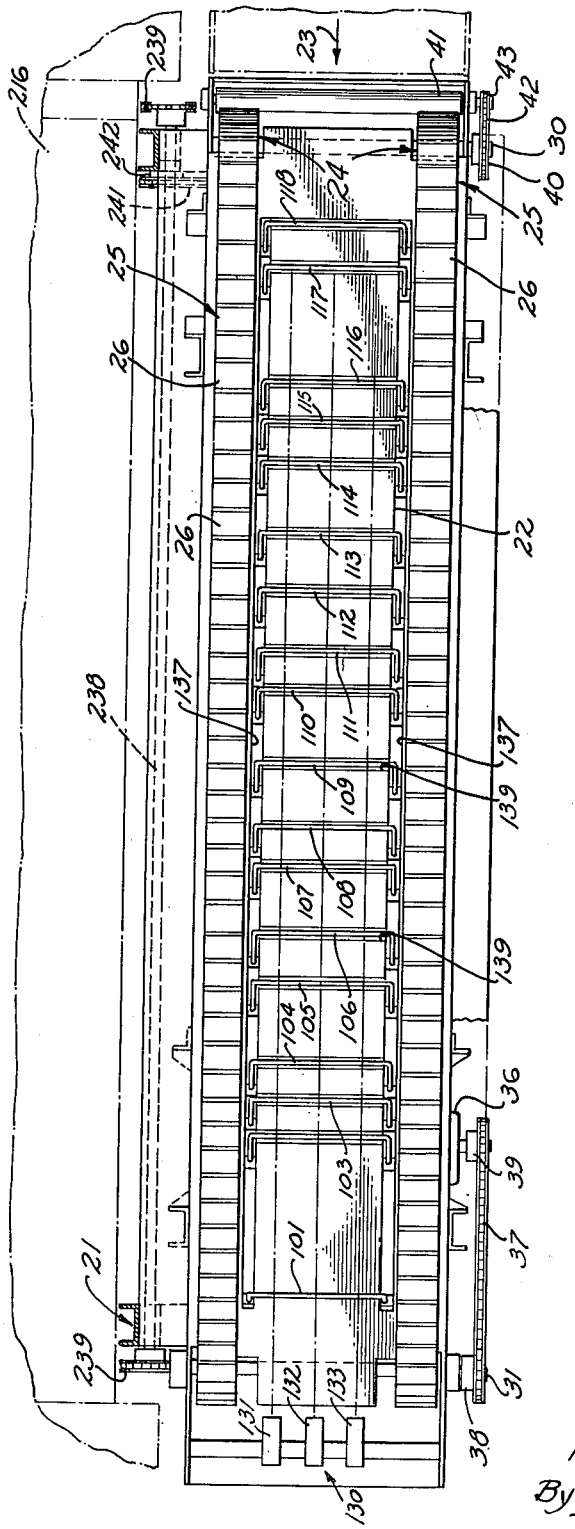
Fig. 2 is a sectional view of the spacing apparatus which is taken along the broken line 2—2 of Fig. 1.

Referring particularly to Figs. 1 and 2 of the drawings, the spacing apparatus of the invention illustrated therein includes a supporting structure or frame 21. Carried by the frame 21 is a generally horizontal platform 22 along which pan straps or other articles to be spaced apart are transported in the direction of the arrow 23 by a conveyor or conveyor means 24. As best shown in Figs. 2 and 3, the conveyor 24 includes two spaced, parallel, endless conveyor elements 25. In the particular construction illustrated, each conveyor element 25 comprises a plurality of plates 26 respectively connected to the links of a chain 27. The chains 27 are trained around sprockets 28 at the upstream end of the path of the pan straps along the platform 22, and are trained around sprockets 29 at the downstream end of such path. The sprockets 28 are mounted on a shaft 30 carried by suitable bearings on the frame 21, and the sprockets 29 are similarly mounted on a shaft 31 also carried by suitable bearings on the frame.

The conveyor 24 is driven by an electric motor 36 through a chain 37 trained around a sprocket 38 on the conveyor shaft 31 and a sprocket 39 on the motor shaft. The shaft 30 carries a sprocket 40 which drives a roller 41 at the upstream end of the pan strap through a chain 42 trained around the sprocket 40 and around a sprocket 43 connected to the roller 41. The purpose of the roller 41 is to bridge the gap between the conveyor 24 and another conveyor, not shown, which delivers pan straps to the conveyor 24.

Spaced apart along the path of the pan straps from the downstream end of such path toward the upstream end thereof are stops 101 to 118, the stop 101 at the downstream end of the pan strap path being a master stop and the remainder being slave stops. It will be understood that while eighteen stops have been disclosed, this number may be decreased or increased as deired.

The stops 101 to 118 are arranged in three groups in the particular construction illustrated, the first group comprising the stops 101, 104, 107, 111, 114 and 117, the second group comprising the stops 101, 103, 106, 109, 112, 115 and 117, and the third group comprising the stops 101, 102, 105, 108, 110, 113, 116 and 118. Thus, the master stop 101 is common to the three groups, the first group comprising the master stop 101 and the sequence of slave stops 104, 107, 111, 114 and 117, the second group comprising the master stop 101 and the sequence of slave stops 103, 106, 109, 112, 115 and 117, and the third group comprising the master stop 101 and the sequence of slave stops 102, 105, 108, 110, 113, 116 and 118. The stops of the first group are spaced apart along the pan strap path substantially equal distances and are adapted to space pan straps of a predetermined maximum length, one such pan strap being indicated by the numeral 121 in Fig. 1. Similarly, the stops of the second group are substantially uniformly spaced, but are closer together and are adapted to space apart pan straps of an intermediate length, such as the pan strap 122 illustrated in Fig. 1. Likewise, the stops of the third group are substantially uniformly spaced, but are still closer together and are adapted to space apart pan straps of a predetermined minimum length, one such pan strap being designated by the numeral 123 in Fig. 1.

As will be discussed in more detail hereinafter, any one of the aforementioned slave-stop sequences of the three groups of stops may be activated, depending upon the length of the pan straps to be spaced apart. The spacing apparatus of the invention includes selector means 130 for activating any one of the slave-stop sequences, the selector means including a selector 131 for the slave-stop sequence of the first group of stops, a selector 132 for the slave-stop sequence of the second group of stops, and a selector 133 for the slave-stop sequence of the third group of stops.

Considering the stops 101 to 118 in more detail with particular reference to Figs. 2 and 3, each of the stops is generally U-shaped and substantially spans the space between the conveyor elements 25. The arms of each U-shaped stop extend downwardly through slots 137 in the platform 22 and are rotatably mounted on a shaft 138 carried by the frame 21. The master stop 101 is rotatable about its shaft 138 from a first operative or partially extended position, which is shown in Fig. 4, to a second operative or fully extended position, which is shown in Figs. 5 and 6. Each of the slave stops 102 to 118 is rotatable about its shaft 138 from an inoperative, retracted position through a first operative, partially extended position to a second operative, fully extended position, each of the slave stops being retracted into a recess 139 in the platform 22 when in its inoperative position. For example, the inoperative position of the slave stop 104 is illustrated in Fig. 4, the partially extended position thereof is illustrated in Fig. 5 and the fully extended position thereof is illustrated in Fig. 6. As will be apparent, when all of the slave stops 102 to 118 are in their retracted positions, they are inoperative to intercept pan straps being transported by the conveyor 24 so that the first pan strap in a file being transported by the conveyor is intercepted by the master stop 101, which is movable only between the partially and fully extended positions discussed above.

Rigidly connected to each of the stops 101 to 118 is a weight 140, the weight 140 connected to the master stop 101 biasing it toward its partially extended position and the weights connected to the slave stops 102 to 118 biasing them toward their retracted positions. Also rigidly connected to each of the stops 101 to 118 is an actuating arm 141.

The spacing apparatus includes three series of actuating means respectively corresponding to the groups of stops discussed above and respectively controlled by the selectors 131, 132 and 133, the actuating means of each series serving to operatively interconnect the slave stops of the corresponding slave-stop sequence and serving to operatively connect the first slave stop in such sequence to the master stop under the control of the corresponding selector. The three series of actuating means are substantially identical and only that series of actuating means associated with the master stop 101 and the slave-stop sequence 104, 107, 111, 114 and 117 will be considered in detail herein. Also, all three selectors are substantially identical and only the selector 131 associated with the master stop 101 and the slave-stop sequence 104, 107, 111, 114 and 117 will be considered herein in detail.

Referring particularly to Fig. 4, the actuating means of the series associated with the slave-stop sequence 104, 107, 111, etc., are identified by the numerals 154, 157, 161, etc., each actuating means being connected to the actuating arm 141 of the corresponding slave stop by a lost-motion slave pivot means 171. The first actuating means 154 in the series under consideration is pivotally connectible to the actuating arm 141 of the master stop 101, under the control of the selector 131, by a lost-motion master pivot means 172.

The actuating means 154 for the first slave stop in the slave-stop sequence 104, 107, 111, etc., includes a link 174 which is connected at its downstream end, i. e., at the end thereof nearest the downstream end of the path taken by the pan straps transported by the conveyor 24, to an element 175 having a notch 176 in its lower surface which receives a pin 177 and which is elongated to provide a lost-motion connection between the element 175 and the pin 177, this pin being carried by the actuating arm 141 of the master stop 101. The weight of the link 174 and the element 175 biases the element 175 downwardly into a position such that the pin 177 is disposed in the notch 176 therein so as to connect the first slave stop 104 in the slave-stop sequence 104, 107, 111, etc., to the master stop. However, by moving the selector 131 for activating the salve-stop sequence 104, 107, 111, etc., to an inoperative position, the element 175 is disengaged from the pin 177 to render this slave-stop sequence inoperative, as will be described in the following paragraph.

The selector 131 is pivotally connected to the frame 21 at 180 and carries a pin 181 which engages a lever 182, the latter being pivotally connected to the frame at 183. The lever 182 carries a pin 184 which engages a stem 185 projecting from the element 175. The selector 131 is movable between an inoperative position, which is shown in broken lines, and an operative position, which is shown in solid lines. As will be apparent, when the selector 131 is moved from its inoperative, or broken line, position to its operative position, it permits the weight of the link 174 and the element 175 with the stem 185 thereon to rotate the lever 182 in the clockwise direction so as to engage the element 175 with the pin 177 on the actuating arm 141 of the master stop 101. Conversely, when the selector 131 is rotated into its inoperative, or broken line, position, it rotates the lever 182 in the counter-clockwise direction so as to disengage the element 175 from the pin 177. As will be described in more detail in the following paragraphs, moving the selector 131 into its operative position activates the corresponding slave-stop sequence 104, 107, 111, etc. In a similar manner, the selectors 132 and 133 activate the slave-stop sequences corresponding thereto so that the selectors 132 and 133 need not be described in detail.

The upstream end of the link 174, i. e., the end thereof nearest the upstream end of the path of the pan straps transported by the conveyor 24, is connected to a yoke 190 which carries a pin 191, the latter extending through the actuating arm 141 of the first slave stop 104 in the slave-stop sequence 104, 107, 111, etc., so as to pivotally connect the yoke 190 to such actuating arm. Disposed between the arms of the yoke 190 is an element 192 having a slot 193 therein for the pin 191 so as to provide a lost-motion connection, the element 192 being connected to the downstream end of a link 197 of the actuating means 157. The foregoing elements for pivotally interconnecting the links 174 and 197 and the actuating arm 141 of the slave stop 104 form one of the slave pivot means 171. The upstream end of the link 197 is connected to the second slave stop 107 in the slave-stop sequence 104, 107, 111, etc., and to a link 201 of the actuating means 161 in the same manner by another of the slave pivot means 171 so that a further description herein is unnecessary.

Considering the operation of the spacing apparatus of the invention as thus far described, and referring particularly to Figs. 4 to 6, it will be recalled that the slave-stop sequence 104, 107, 111, etc., is capable of spacing apart the pan straps 121 of a predetermined maximum length, a file of such pan straps being transported in the direction of the arrow 23 toward the master stop 101 by the conveyor 24. Prior to the time that the first pan strap 121 in the file reaches the master stop 101, the master stop is in its partially extended or first operative position, as shown in Fig. 4, and the slave stops are all in their retracted, or inoperative, positions, also as shown in Fig. 4. Thus, the first pan strap 121 in the file passes over all of the slave stops.

As shown in Fig. 5, when the first pan strap 121 in the file engages the master stop 101, it is intercepted by the master stop and, further, rotates the master stop into its fully extended, or second operative, position, the conveyor elements 25 thereafter sliding under the first pan strap. The rotational movement of the master stop 101 occasioned by the pan strap 121 intercepted thereby is communicated to the first slave stop 104 in the slave-stop sequence 104, 107, 111, etc., assuming, of course, that the selector 131 is in its operative position so as to engage the element 175 with the pin 177. The angle through which the master stop 101 rotates under such conditions is such that the actuating means 154 connecting the first slave stop 104 in the sequence under consideration to the master stop rotates the first slave stop 104 from its retracted position to its partially extended position. Because of the lost-motion connection between the pin 191 and the element 192 on the link 197 leading to the next slave stop 107, the slave stop 107 remains in its retracted position. Consequently, the second pan strap 121 in the file passes over all of the slave stops until it reaches the slave stop 104, whereupon it is intercepted by the slave stop 104 and, further, rotates the slave stop 104 from its partially extended position to its fully extended position to rotate the next slave stop 107 in the sequence from its inoperative position to its partially extended position, such rotation of the slave stop 104 to its fully extended position having no effect on the master stop 101 because of the lost-motion connection between the element 175 and the pin 177. In a similar manner, the slave stop 107 intercepts the third pan strap 121 in the file and simultaneously moves the slave stop 111 into its partially extended position so as to intercept the fourth pan strap, and so forth.

Thus, it will be apparent that the master stop 101, upon intercepting a pan strap, activates the first slave stop 104 in the sequence, whereupon the slave stop 104 intercepts the second pan strap in the file, and in turn, activates the slave stop 107, and so forth. This procedure is repeated until pan straps 121 have been intercepted by the master stop 101 and by all of the slave stops in the slave-stop sequence 104, 107, 111, etc.

When the selector 132 is moved to its operative position to activate the slave-stop sequence 103, 106, 109, etc., the operation is substantially identical, except that a larger number of pan straps will be intercepted because of the closer spacing of the stops. Similarly, when the selector 133 is moved to its operative position, the slave-stop sequence 102, 105, 108, etc., will operate in substantially the same manner except that it will intercept a still larger number of pan straps because of the still closer spacing.

As best shown in Fig. 4, a lever 204 carrying a switch means 205 is pivotally connected to the frame 21 at 206 adjacent the upstream end of the path of the pan straps transported by the conveyor 24. Pivotally connected to the lever 204 is a link 207 which is pivotally connected to the last slave stop in each of the slave-stop sequences by one of the lost-motion slave pivot means 171. In other words, the link 207 is pivotally connected to the slave stops 117 and 118 by two of the lost-motion slave pivot means 171 identical to those hereinbefore described, the slave stop 117 being the last in the sequences 104, 107, 111, etc., and 103, 106, 109, etc., and the slave stop 118 being the last in sequence 102, 105, 108, etc. Consequently, whenever the last slave stop in any one of the three sequences is rotated into its fully extended position upon interception of a pan strap thereby, it, acting through the link 207, rotates the switch means 205 into an operative position, not shown, from the inoperative position shown in Fig. 4 of the drawings. The switch means 205 includes two switches 208 and 209, such as mercury switches, for example, which are illustrated in diagrammatic form in Fig. 9 of the drawings and the functions of which will be described hereinafter.

Figure 8:
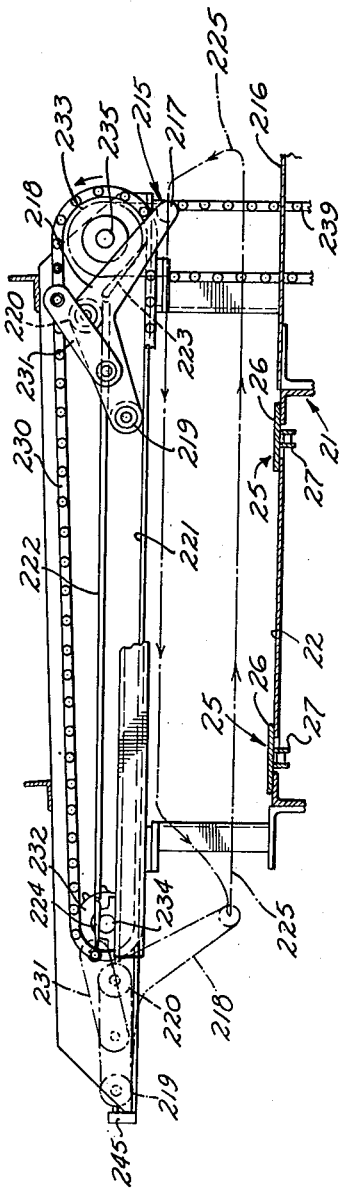
Fig. 8 is an enlarged fragmentary sectional view taken along the broken line 8—8 of Fig. 1.

After the pan straps of a file being transported by the conveyor 24 have been spaced apart in the manner hereinbefore discussed, they may be transferred laterally into a traveling oven, not shown, operating at right angles to the conveyor 24, or onto any other conveyor, not shown, operating at right angles to the conveyor 24. Referring particularly to Figs. 1 and 8 of the drawings, illustrated therein is a transfer means 215 which may be employed to transfer the spaced pan straps laterally from the conveyor 24 along a lateral platform 216 leading to a traveling oven, or other apparatus. The transfer means 215 is illustrated as including a sweep bar 217 which is carried by arms 218 at its ends, each arm 218 being provided with rollers 219 and 220. Guides or tracks 221 and 222 are carried by the frame 21 at either end of the sweep bar 217, the roller 219 on each arm 218 being adapted to move back and forth along the corresponding track 221 and the roller 220 on each arm being adapted to move alternately on the corresponding track 221 and the corresponding track 222. Downwardly biased track switches 223 at one end of the tracks 222 serve to switch the rollers 220 onto the tracks 222 when they reach the corresponding end of the tracks 221. More particularly, assuming that the rollers 219 and 220 on the arms 218 are on the tracks 221, and that the arms are being moved toward the right, as viewed in Fig. 8 of the drawings, when the rollers 220 reach the right end of the tracks 221, they pass under the track switches 223, which then move downwardly so that, as the rollers 220 move toward the left, as viewed in Fig. 8, they move upwardly onto the upper tracks 222. When the rollers 220 reach the left end of the upper tracks 222, as viewed in Fig. 8, they drop down onto the lower tracks 221 again and then remain on the lower tracks during movement to the right, as viewed in Fig. 8, upwardly biased track switches 224 being provided to ease the rollers 220 downwardly onto the lower tracks.

Thus, as will be apparent, with the pattern of movement described above, the sweep bar 217 follows the path designated by the arrowed broken line 225, the sweep bar acting to transfer spaced pan straps laterally from the conveyor 24 during movement thereof along the lower leg of the path, and returning above any pan straps on the conveyor 24 during its return movement along the upper leg of its path.

The sweep bar 217 is driven by chains 230 respectively disposed at the ends thereof and respectively connected to the arms 218 supporting the sweep bar by links 231, the links being pivotally connected to the arms 218 and to the chains 230 so that the rollers 219 and 220 carried by each arm may follow the pattern of movement discussed above. Each of the chains 230 is trained around sprockets 232 and 233 respectively mounted on shafts 234 and 235 carried by suitable bearings on the frame 21. As best shown in Fig. 1, the shafts 234 carry additional sprockets 236 which are driven from sprockets 237 on a countershaft 238 through chains 239. The countershaft 238 is driven by an electric transfer drive motor 240 through a chain 241 trained around a sprocket 242 (Fig. 2) on the countershaft and a sprocket 243 on the motor shaft.

As shown in Fig. 9, the hereinbefore described switch 209 of the switch means 205, which is actuable by the last slave stop in each slave-stop sequence, is connected in series with the transfer drive motor 240, the switch 209 being normally open, i. e., being open as long as the switch means 205 is in the inoperative position shown in Fig. 4. Similarly, the switch 208 is connected in series with the conveyor drive motor 36, the switch 208 being normally closed, i. e., being closed when the switch means 205 is in the inoperative position shown in Fig. 4. Connected in parallel with the switch 209 is a limit switch 245 which is self closing, but which is adapted to be held open by one of the arms 218 carrying the sweep bar 217 when the sweep bar reaches a rest position, shown in phantom in Fig. 8 of the drawings.

Considering the over-all operation of the embodiment of the invention illustrated in Figs. 1 to 9 of the drawings, it will be assumed that the switches 208, 209 and 245 are in the positions shown in Fig. 9. Under such conditions the conveyor drive motor 36 is energized to drive the conveyor 24, but the transfer drive motor 240 is de-energized with the sweep bar 217 in its rest position.

Now assume that a file of pan straps is delivered to the inlet end of the conveyor 24 in any suitable manner, as by another conveyor, not shown. Also assume that the selector 131, 132 or 133 corresponding to the length of the pan straps being delivered to the conveyor 24 has been moved to its operative position, thereby activating the corresponding slave-stop sequence. For example, assume that pan straps of the predetermined maximum length are being transported by the conveyor 24, which means that the selector 131 for activating the slave-stop sequence 104, 107, 111, etc., is in its operative position.

As hereinbefore discussed in more detail, the first pan strap in the file transported by the conveyor 24 passes over all of the slave stops and is intercepted by the master stop 101. Under the conditions outlined above, the master stop, in being moved from its partially extended position to its fully extended position by the pan strap intercepted thereby, moves the first slave stop 104 in the slave-stop sequence in operation into its partially extended position to intercept the second pan strap, this process being repeated until all of the slave stops in the sequence in operation have intercepted pan straps. When the last slave stop 117 in the sequence in operation intercepts a pan strap, it is also rotated from its partially extended position to its fully extended position, and, as this occurs, the slave stop 117 acts through the link 207 to move the switch means 205 to its operative position, thereupon opening the switch 208 to de-energize the conveyor drive motor 36 and closing the switch 209 to energize the transfer drive motor 240. De-energizing the conveyor drive motor 36 interrupts delivery of pan straps to the spacing apparatus, while energization of the transfer drive motor 240 causes the sweep bar 217 to transfer the spaced pan straps laterally from the conveyor 24. As soon as the sweep bar 217 has transferred the spaced pan straps from the conveyor 24, the slave stops in operation fall back into their retracted positions because of the action of their weights 140 thereon, and the master stop 101 falls into its partially extended position of the action of its weight 140. As will be apparent, when the slave stop 117 falls back into its retracted position, it returns the switch means 205 to its inoperative position, thereby closing the switch 208 and opening the switch 209. Such closure of the switch 208 re-energizes the conveyor drive motor 36 to deliver additional pan straps to the article spacing apparatus, whereupon the foregoing sequence of events is repeated. Because of the presence of the switch 245 in the circuit of the transfer drive motor 240 opening of the switch 209 does not result in immediate de-energization of the transfer drive motor 240, the latter remaining energized until it has returned the sweep bar 217 to its rest position, whereupon the limit switch 245 is opened to de-energize the transfer drive motor. The transfer drive motor remains de-energized until such time as pan straps have been intercepted by the master stop 101 and by all of the slave stops in the sequence in operation, whereupon the foregoing cycle of events is repeated in its entirety.

Figure 10:
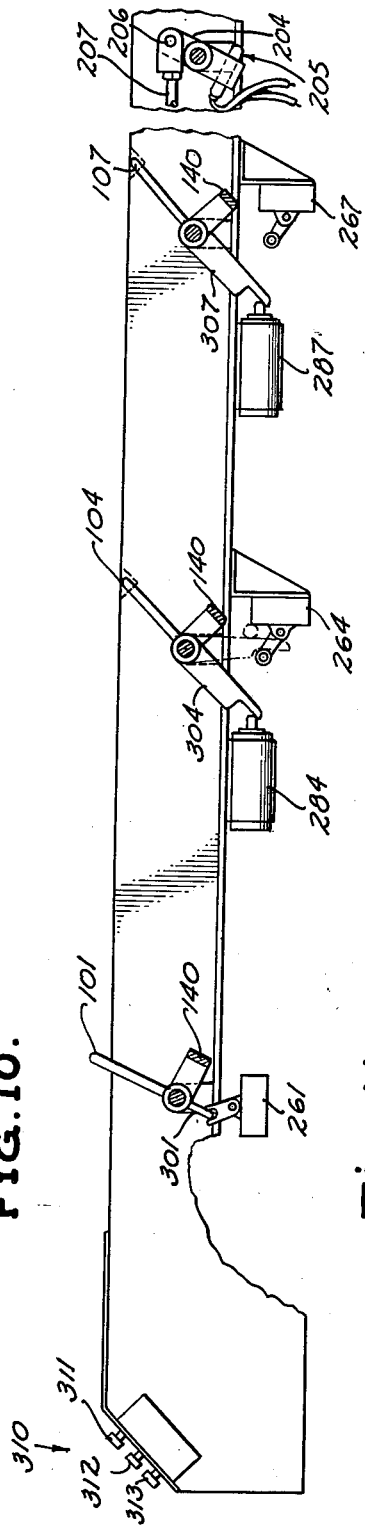
Fig. 10 is a view similar to Figs. 4, 5 and 6 but illustrating another embodiment of the invention; and, Fig. 11 is a schematic view illustrating an electrical circuit of the embodiment of Fig. 10.
Figure 11:
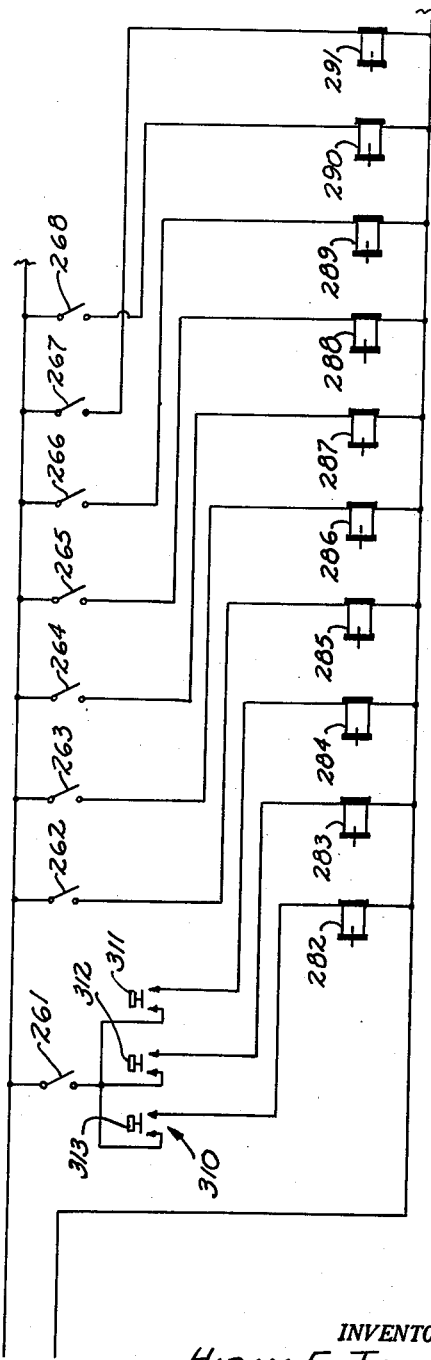

Referring now to Figs. 10 and 11 of the drawings, the embodiment illustrated therein is similar to that illustrated in Figs. 1 to 9, the only differences being in the actuating means for activating the slave stops of the slave-stop sequence selected for operation, and in the selector means for selectively operating the various slave-stop sequences. Accordingly, identical reference numerals are employed to designate corresponding components in both embodiments.

Fig. 10 of the drawings is similar to Fig. 4 in that it shows the master stop 101 and the first two slave stops 104 and 107 of the slave-stop sequence 104, 107, 111, etc. As in the embodiment previously described, the slave-stop sequences 103, 106, 109, etc., and 102, 105, 108, etc., are similar to the sequence 104, 107, 111, etc., and will not be described in detail.

Respectively associated with the master stop 101 and the slave stops 102, 103, 104, etc., in the embodiment presently under consideration are switches 261, 262, 263, 264, etc., and respectively associated with the slave stops 102, 103, 104, etc., are solenoids 282, 283, 284, etc., all such switches and solenoids being shown in Fig. 11 and those switches and solenoids associated with the master stop 101 and the slave stops 104 and 107 of the slave-stop sequence 104, 107, 111, etc., being shown in Fig. 10. The switch 261 associated with the master stop 101 is actuable by an arm 301 rigidly connected to the master stop, the switch 261 being open when the master stop 101 is in its partially extended position and being closed by the arm 301 upon movement of the master stop to its fully extended position by a pan strap intercepted thereby. Each of the slave stops 102 to 118 is provided with a similar arm which is engageable by the corresponding solenoid and which is engageable with the corresponding switch, such arms associated with the slave stops 104 and 107 shown in Fig. 10 being identified by the numerals 304 and 307, respectively. As will be apparent, when the solenoid 284 associated with the slave stop 104 is energized, its acts on the arm 304 to move the slave stop 104 from its retracted position to its partially extended position, the same being true of the solenoids associated with the other slave stops. Upon movement of the slave stop 104, for example, from its partially extended position to its fully extended position by a pan strap intercepted thereby, the arm 304 connected to the slave stop 104 engages the corresponding switch 264, as shown in Fig. 10, and closes such switch, the same relation obtaining between all of the slave stops and the switches corresponding thereto. Thus, as the master stop 101 is moved to its fully extended position, it closes the switch 261 associated therewith, and as each of the slave stops 102 to 118 is moved to its fully extended position, it closes the switch associated therewith, movement of the slave stops to their partially extended positions being accomplished by the solenoids 282, 283, 284, etc.

Referring to Fig. 11, the embodiment presently under consideration includes a selector means 310 for selectively operating the three slave-stop sequences, the selector means comprising three selector switches 311, 312 and 313 connected in parallel with each other and connected in series with the switch 261 associated with the master stop 101. The selector switches 311, 312 and 313 are, in turn, connected in series with the solenoids 282, 283 and 284, respectively, these three solenoids being adapted to actuate the slave stops 102, 103 and 104, respectively, to move them from their retracted positions to their partially extended positions. The remaining switches 262, 263, 264, etc., are respectively connected in series with the solenoids 285, 286, 287, etc., for actuating the slave stops 105, 106, 107, etc., to move them from their retracted positions to their partially extended positions.

Considering the operation of the embodiment illustrated in Figs. 10 and 11, it will be assumed that the slave-stop sequence 104, 107, 111, etc., is to be operated. In order to place this sequence in operation, it is merely necessary to close the selector switch 311 in series with the solenoid 284 associated with the first slave stop 104 in this sequence. Under these conditions, when the first pan strap in a file being transported by the conveyor 24 engages the master stop 101 and moves it from its partially extended position to its fully extended position, the arm 301 connected to the master stop closes the switch 261. Closure of this switch results in energization of the solenoid 284 associated with the first slave stop 104 in the desired sequence, the solenoids 282 and 283 associated with the slave stops 102 and 103 being unaffected because of the presence of the open switches 312 and 313 in their respective circuits. When the solenoid 284 is energized in this manner, it moves the first slave stop 104 in the desired sequence into its partially extended position so as to render the slave stop 104 operative to intercept the second pan strap in the file being transported by the conveyor 24. Subsequently, the second pan strap in the file engages the slave stop 104 and moves this slave stop to its fully extended position, thereby closing the switch 264 so as to energize the solenoid 287 associated with the second slave stop 107 of the sequence in operation. The solenoid 287 then moves the second slave stop 107 in the sequence into its partially extended position so that it will intercept the third pan strap in the file being transported by the conveyor 24. When the slave stop 107 intercepts the third pan strap in the file, it is moved into its fully extended position to close the switch 267, which then energizes the solenoid 291 for moving the slave stop 111 to its partially extended position. This process is continued until the master stop 101 and all of the slave stops in the sequence 104, 107, 111, etc., have intercepted pan straps.

As will be apparent, upon closure of the selector switch 312, the slave-stop sequence 103, 106, 109, etc., is placed in operation, and, upon closure of the selector switch 313, the slave-stop sequence 102, 105, 108, etc., is placed in operation. Thus, any one of the three slave-stop sequences illustrated may be placed in operation merely by closing the corresponding one of the selector switches 311, 312 and 313.

As in the embodiment previously described, the embodiment of Figs. 10 and 11 includes the switch means 205 which is movable from its inoperative position to its operative position by the link 207, the latter being pivotally connected to the last slave stop in each sequence by one of the slave pivot means 171 as hereinbefore described. In other words, the link 207 controlling the switch means 205 is pivotally connected to the slave stops 117 and 118 by two of the slave pivot means 171 in the particular construction illustrated. The switches 208 and 209 of the switch means 205 together with the switch 245, control the motors 36 and 240 in the manner hereinbefore described.

Thus, the present invention provides an apparatus for automatically and accurately spacing apart articles being transported by a conveyor so that the spaced articles may be transferred laterally from the path of the conveyor in spaced relation, or may be otherwise handled. It will be understood that although a spacing apparatus having three slave-stop sequences has been disclosed, the number of such sequences may be increased or decreased as required, depending upon the number of article sizes to be handled thereby. Also, the number of slave stops in each sequence may be increased or decreased as desired.

Although two exemplary embodiments of the invention have been illustrated herein, it will be understood that various changes, modifications and substitutions may be incorporated in such embodiments without departing from the spirit of the invention.

I claim as my invention:

1. In an apparatus for spacing articles, the combination of: a supporting structure providing a path having upstream and downstream ends; means for transporting successive articles along said path toward said downstream end thereof; a master stop carried by said supporting structure adjacent said downstream end of said path and disposed in said path for intercepting an article being transported therealong;

a plurality of sequences of slave stops carried by said supporting structure, said slave stops of each of said sequences being spaced apart along said path upstream from said master stop and normally being inoperative to intercept articles being transported along said path; a plurality of series of actuating means respectively corresponding to said sequences of slave stops, said actuating means of each of said series being respectively connected to said slave stops of the corresponding one of said sequences to render said slave stops of said corresponding sequence operative to intercept articles being transported by said conveyor means, the first actuating means in each of said series being operatively connectible to said master stop and being operable by said master stop upon interception thereby of an article being transported so as to render operative the first slave stop in the corresponding one of said sequences, and the second and subsequent actuating means in each of said series respectively being operatively connected to the first and subsequent slave stops in the corresponding one of said sequences and respectively being operable by the first and subsequent slave stops in the corresponding one of said sequences upon interception thereby of articles being transported so as to respectively render operative the second and subsequent slave stops in the corresponding one of said sequences; and selector means for operatively connecting any one of said first actuating means to said master stop.

2. In an apparatus for spacing articles, the combination of: a supporting structure providing a path having upstream and downstream ends; conveyor means carried by and movable relative to said supporting structure for transporting successive articles along said path toward said downstream end thereof; conveyor drive means carried by said supporting structure for driving said conveyor means; a movable master stop carried by said supporting structure adjacent said downstream end of said path and disposed in said path for intercepting an article being transported by said conveyor means, said master stop being movable from a first operative position to a second operative position by an article intercepted thereby; a plurality of sequences of movable slave stops carried by said supporting structure, said slave stops of each of said sequences being spaced apart along said path upstream from said master stop, each of said slave stops being movable from an inoperative position through a first operative position to a second operative position, said slave stops being inoperative to intercept articles being transported by said conveyor means when in their inoperative positions, but being disposed in said path when in their first operative positions so as to intercept articles being transported by said conveyor means, and said slave stops being movable from their first operative positions to their second operative positions by articles intercepted thereby; a plurality of series of actuating means respectively corresponding to said sequences of slave stops, said actuating means of each of said series being respectively connected to said slave stops of the corresponding one of said sequences to move said slave stops of said corresponding sequence from their inoperative positions to their first operative positions to intercept articles being transported by said conveyor means, the first actuating means in each of said series being operatively connectible to said master stop and being operable by said master stop upon interception thereby of an article being transported by said conveyor means so as to move the first slave stop in the corresponding one of said sequences from its inoperative position to its first operative position, and the second and subsequent actuating means in each of said series respectively being operatively connected to the first and subsequent slave stops in the corresponding one of said sequences and respectively being operable by the first and subsequent slave stops in the corresponding one of said sequences upon interception thereby of articles being transported by said conveyor means so as to respectively move the second and subsequent slave stops in the corresponding one of said sequences from their inoperative positions to their first operative positions; and selector means for operatively connecting any one of said first actuating means to said master stop.

3. An apparatus as defined in claim 2 wherein each of said actuating means comprises link means having a lost-motion connection to one of the stops to which such actuating means is connected.

4. An apparatus as defined in claim 2 wherein said master stop is provided with an element engageable with an element of any one of said first actuating means, said selector means including means for engaging said element of any one of said first actuating means with said element of said master stop.

5. In an apparatus for spacing articles, the combination of: a supporting structure providing a path having upstream and downstream ends; conveyor means carried by and movable relative to said supporting structure for transporting successive articles along said path toward said downstream end thereof; conveyor drive means carried by said supporting structure for driving said conveyor means; a master stop pivotally connected to said supporting structure adjacent said downstream end of said path, said master stop being pivotable from a first operative position, wherein it is disposed in said path to intercept an article being transported by said conveyor means, to a second operative position; at least one slave stop pivotally connected to said supporting structure upstream from said master stop, said slave stop being pivotable from an inoperative position, wherein it is out of said path, through a first operative position, wherein it is disposed in said path to intercept an article being transported by said conveyor means, to a second operative position; lost-motion link means pivotally connecting said slave stop to said master stop for pivoting said slave stop from its inoperative position to its first operative position upon pivotal movement of said master stop from its first operative position to its second operative position by an article intercepted thereby, said link means including a link extending between said master and slave stops substantially parallel to said path and pivotally connected at its upstream end to said slave stop, said link means including master pivot means pivotally connecting the downstream end of said link to said master stop, said master pivot means including an element carried by said master stop and an element carried by said link, said elements being disengageable to disconnect said slave stop from said master stop; and means for disengaging said elements.

6. An apparatus according to claim 5 wherein one of said elements is a pin and the other of said elements is provided with an elongated slot therein for said pin to provide a lost-motion connection between said elements, said slot being open on one side to permit disengagement of said elements.

7. In an apparatus for spacing articles, the combination of: a supporting structure providing a path having upstream and downstream ends; conveyor means for transporting successive articles along said path toward said downstream end thereof; a plurality of spacing means each adapted to space apart along said path articles of a particular length; and selector means for activating any one of said spacing means.

8. In an apparatus for spacing articles, the combination of: a supporting structure providing a path having upstream and downstream ends; a conveyor carried by said supporting structure and movable along said path toward said downstream end thereof for transporting articles in sequence along said path toward said downstream end thereof; at least two spacing means each including at least two spacing elements spaced apart along said path, said spacing means being carried by said supporting structure; and selector means carried by said supporting structure and operatively connected to said spacing means for activating any one of said spacing means.

9. In an apparatus for spacing articles, the combination of: a supporting structure providing a path having upstream and downstream ends; a conveyor carried by said supporting structure and movable along said path toward said downstream end thereof for transporting articles in sequence along said path toward said downstream end thereof; at least two groups of spacing elements carried by said supporting structure, at least some of the spacing elements of each group being movable between extended positions wherein they are disposed in said path and retracted positions wherein they are disposed out of said path; actuating means connecting said spacing elements of each group for extending said spacing elements into said path in sequence; and selector means operatively connected to said actuating means for activating any one of said actuating means.

10. In an apparatus for spacing articles, the combination of: a supporting structure providing a path having upstream and downstream ends; a conveyor carried by said supporting structure and movable along said path toward said downstream end thereof for transporting articles in sequence along said path toward said downstream end thereof; at least two groups of stops carried by said supporting structure, the stops of each of said groups being spaced apart along said path and each group having at least one stop which is movable between a retracted position and an extended position wherein it is disposed in said path; actuating means carried by said supporting structure and operatively connected to the movable stops of each group for extending the movable stops of each group in sequence; and selector means carried by said supporting structure and engageable with said actuating means for activating any one of said actuating means.

HIRAM E. TEMPLE.

REFERENCES CITED

The following references are of record in the file of this patent:

UNITED STATES PATENTS

| Number | Name | Date |
|---|---|---|
| 1,642,992 | Fuller | Sept. 20, 1927 |
| 2,467,113 | Deiters | Apr. 12, 1949 |
| 2,549,341 | Sperling | Apr. 17, 1951 |